United States Patent
Sen et al.

(10) Patent No.: US 6,466,544 B1
(45) Date of Patent: Oct. 15, 2002

(54) GPRS MAC PROCEDURES TO SUPPORT REAL-TIME SERVICES

(75) Inventors: Sanjoy Sen, Plano, TX (US); Tanuj Bagchi, Plano, TX (US); Joseph Ho, Sunnyvale, CA (US); Kalyan Basu, Plano, TX (US); Indranil Bob Tapadar, Ontario (CA); Chiew-Leong Saw, Ontario (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/469,668

(22) Filed: Dec. 22, 1999

(51) Int. Cl.$^7$ ............................................. H04B 7/212
(52) U.S. Cl. ..................... 370/231; 370/443; 370/447; 370/461; 370/462; 370/468; 370/477
(58) Field of Search ................................ 370/231, 235, 370/314, 321, 322, 326, 328, 329, 330, 331, 336, 337, 338, 345, 347, 348, 349, 389, 442, 443, 445, 447, 461, 462, 468, 477; 455/450, 509

(56) References Cited

U.S. PATENT DOCUMENTS

| | | | | |
|---|---|---|---|---|
| 5,926,469 A | * | 7/1999 | Norstedt et al. | 370/329 |
| 6,031,832 A | * | 2/2000 | Turina | 370/348 |
| 6,356,759 B1 | * | 3/2002 | Mustajarvi | 455/450 |
| 6,052,594 A1 | * | 4/2002 | Chuang et al. | 455/450 |
| 6,374,112 B1 | * | 4/2002 | Widgren et al. | 455/452 |

OTHER PUBLICATIONS http://www.etsi.org/smg/work/gprs_spec.htm: General Packet Radio Service (GPRS) Specifications.

* cited by examiner

*Primary Examiner*—Daniel Hunter
*Assistant Examiner*—James D Ewart
(74) *Attorney, Agent, or Firm*—Haynes & Boone, LLP

(57) ABSTRACT

A system and method for GPRS MAC procedures to support delay-sensitive, real-time traffic is presented. The system comprises a mobile station able to transmit packets to and receive packets from a base station, where the base station is coupled to a General Packet Radio Service (GPRS) network, and where the GPRS network is coupled to a data network. In an uplink dynamic scheme, the base station receives an empty packet from the mobile station. The base station releases a bandwidth allocated to the mobile station if an implementation dependent time expires and further allocates a reduced portion of the bandwidth to the mobile station if a number of the empty packets are received or if a control packet requesting additional bandwidth is received by the base station. In an uplink fixed scheme, the base station allocates a fixed number of radio resources to the mobile station. The base station releases the radio resources allocated to the mobile station, if the fixed number of radio resources are not utilized and further allocates a reduced bandwidth to the mobile station if a number of empty packets are received.

42 Claims, 2 Drawing Sheets

GPRS MAC PROCEDURES TO SUPPORT REAL-TIME SERVICES

BACKGROUND

This application relates generally to General Packet Radio Service (GPRS) Media Access Control (MAC) procedures and, more particularly, to GPRS MAC procedures to support delay-sensitive, real-time traffic.

GPRS refers to a technology that increases data transmission speeds from 9.6 Kbps to over 100 Kbps, is packet based, and supports the leading internet communication protocols, Internet Protocol (IP) and X.25. As such, an internet connection, for example, can be extended directly to a mobile device thereby bypassing dial-up from an internet service provider. GPRS will complement rather than replace the current data services available through today's Global Services for Mobile communications (GSM) digital cellular networks such as circuit-switched data and Short Message Service. While the majority of wireless applications tend to be text oriented, the high throughput offered by GPRS provides multimedia content capability (such as graphical web-based applications).

MAC performs most of the data link layer functions (Layer 2) of the Open Systems Interconnection communication reference model. Layer 1 is the detailed physical level that involves actually generating and receiving the electronic signals while Layer 3 is the higher level that has knowledge about the network, including access to router tables that indicate where to forward data. The two approaches to MAC are called controlled access/polling and contention. Controlled access describes a processor that determines which device can access network media at a particular time. Polling involves sending a signal to a terminal giving it permission to transmit or asking it to receive while contention permits the signal to be transmitted and/or received at any time.

Although the conventional GPRS MAC/Radio Link Control (which supports link layer packet transmission) procedures provide certain advantages, they do no support real-time packet services such as voice over IP (VoIP).

Therefore, an improved system and method for GPRS MAC procedures to support delay-sensitive, real-time traffic is desired to reduce or eliminate these limitations and design complexities.

SUMMARY

In response to these and other limitations, provided herein is a unique system and method for GPRS MAC procedures to support delay-sensitive, real-time traffic.

The system (or communication network) comprises a mobile station able to transmit packets to and receive packets from a base station, where the base station is coupled to a General Packet Radio Service (GPRS) network, and where the GPRS network is coupled to a data network. In one embodiment, the base station receives an empty packet from the mobile station. The base station releases a bandwidth allocated to the mobile station if an implementation dependent time expires and allocates a reduced portion of the bandwidth to the mobile station if a number of the empty packets are received.

In some embodiments, the mobile station transmits the packets via the reduced portion of the bandwidth when the packets again need to be transmitted.

In some embodiments, the base station receives the packets and re-allocates the bandwidth to the mobile station, when a first one of the packets is received by the base station.

In some embodiments, the base station re-allocates the bandwidth to the mobile station, when a control message requesting more bandwidth is received by the base station.

In some embodiments, a high priority to the bandwidth allocated for conversational class packets is provided.

In some embodiments, a base station allocates a fixed number of radio resources to a mobile station.

In some embodiments, the base station releases the fixed number of radio resources, if the fixed number of radio resources are not utilized.

In some embodiments, the base station allocates a reduced portion of the fixed number of radio resources to the mobile station if a number of empty packets are received.

In some embodiments, the mobile station transmits the packets via the reduced portion of the fixed number of radio resources.

In some embodiments, the base station receives the packets and re-allocates the fixed number of radio resources to the mobile station when a first one of the packets is received by the base station.

In some embodiments, a high priority to the fixed number of radio resources allocated for conversational class packets is provided.

In some embodiments, the packets comprise real-time voice packets, real-time data packets, real-time multi-media packets, and/or signaling packets.

These advantages, as well as others which will become apparent, are described in greater detail with respect to the drawings and the following disclosure.

DETAILED DESCRIPTION

Figure 1:
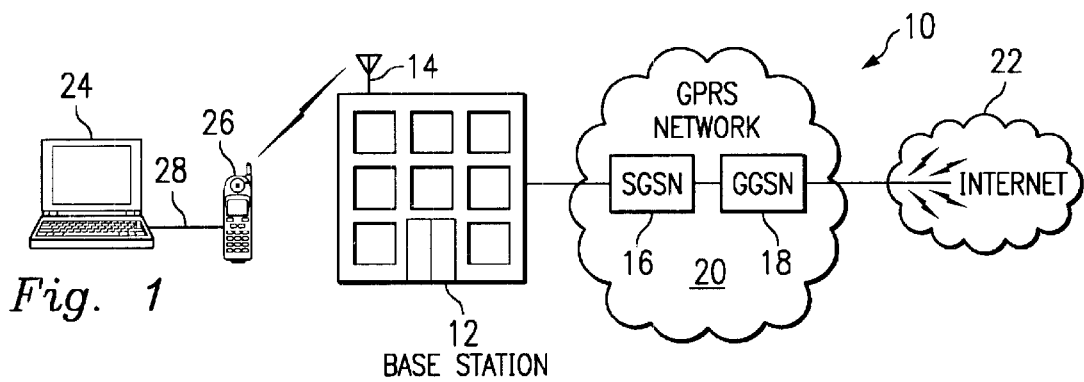
FIG. 1 is a diagrammatic view of a communication system of the present invention.

FIG. 1 depicts a communication network 10 of the present invention. The network includes a base station 12 coupled to a base transceiver station (BTS) 14, and a Serving GPRS Support Node (SGSN) 16 coupled to the base station 12 and to a Gateway GPRS Support Node (GGSN) 18. The GGSN 18 may be coupled to an external network such as Internet network 22.

The network 10 is accessed by a notebook computer 24 connected to a GPRS-capable mobile station 26 or modem (not shown) through a serial cable 28 or other type of connection such as Universal Serial Bus, a local wireless link, or through a PC Card (not shown). The GPRS mobile station 26 or modem communicates with the base station 12 (such as a GSM base station), but unlike circuit-switched data calls which are connected to voice networks by the Mobile Switching Center, GPRS packets are sent from the base station 12 to the SGSN 16. The SGSN 16 is the node within the GPRS network 20 that sends and receives data to and from the mobile station 26. It also keeps track of the mobile stations within its service area. The SGSN 16 communicates with the GGSN 18 which is the node within the GPRS network 20 that maintains connections with other networks such as the Internet 22, X.25 networks (not shown) or private networks (not shown). The GPRS network 20 can use multiple serving nodes, but requires only one gateway node for connecting to an external network such as the Internet 22.

The mobile station 26 sends data packets via the SGSN 16 to the GGSN 18 where they are converted for transmission over the desired external network. Conversely, IP packets from the Internet 22 addressed for the mobile station 26 are received by the GGSN 18, forwarded to the SGSN 16, and then transmitted to the mobile station 26. To forward IP or X.25 packets between each other, the SGSN 16 and the GGSN 18 encapsulate these packets using a specialized protocol called the GPRS tunnel protocol which operates on top of standard TCP/IP protocols.

The GPRS protocol defines a mechanism by which a mobile station can request the amount of bandwidth it desires at the time it establishes a data session. Speeds of over 100 kbps are achieved (even though the current circuit-switched data is limited to 9600 or 14.4 kbps) by using the same radio channel as voice calls (which are 200 kHz wide). This radio channel carries a raw digital radio stream of 271 kbps which for voice calls, is divided into 8 separate data streams each carrying nearly 34 kbps. After protocol and error correction overhead, 13 kbps remain for each voice connection or approximately 14 kbps for each data connection. One voice channel is currently used to transport circuit-switched data. GPRS, however, can combine up to 8 of these voice channels and, since each of these channels can deliver up to 14 kbps of data throughput, transport rates of over 100 Kbps are possible.

Figure 2:
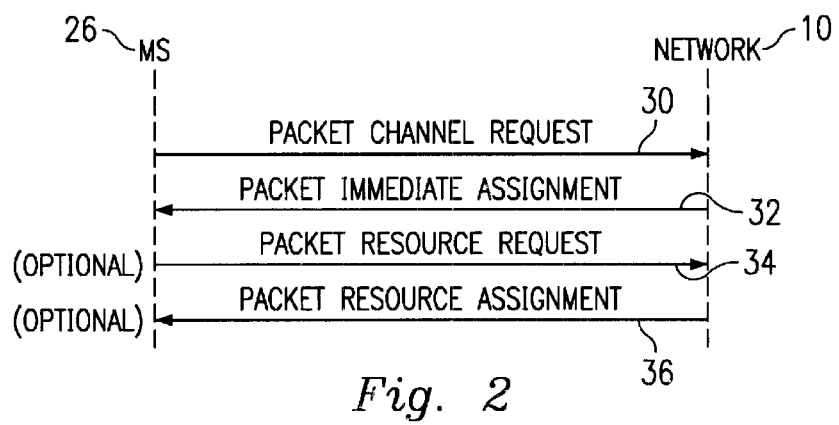
FIG. 2 is a prior art message flow between a mobile station and the GPRS network for radio resource allocation.

FIG. 2 depicts a prior art message flow between the mobile station (MS) 26 and the network 10. This message flow is known as an uplink data transfer because the MS 26 initiates contact with the network 10. A Packet Channel Request message 30 is sent by the MS 26 via a packet common control channel. Upon receiving this message 30, the network 10 responds with a Packet Immediate Assignment message 32 which contains the reserved uplink channels for the MS 26. If additional reserved uplink channels are needed, the MS 26 sends a Packet Resource Request message 34 to the network 10 requesting additional channels. These additional channels are provided to the MS 26 via a Packet Resource Assignment message 36. When the MS 26 fails to contend for a slot, it resorts to exponential backoff with a certain persistence factor which is determined from the priority of the packet, amount of traffic within higher priority classes and the amount of traffic within the same priority class (of which there are four, with class 1 being the highest).

The two types of resource allocation schemes in GPRS are dynamic allocation and fixed allocation. In a dynamic allocation scheme, the Packet Immediate Assignment message 32 includes a list of packet data channels and a corresponding uplink state flag value per packet data channel. The MS 26 monitors the uplink state flags on the allocated packet data channels and transmits data on those channels which currently bear the uplink state flag values assigned to the mobile. Two modes of allocation, open-ended and close-ended, exist. In the open-ended mode, the MS 26 may use the uplink resources as long as buffered data in the MAC/RLC layer exists. Higher priority packets and pending control messages, however, can temporarily interrupt a data transmission from the MS26.

In a fixed allocation scheme, the Packet Immediate Assignment message 32 or the Packet Resource Assignment message 36 contains a bit-map with information relating to the uplink radio blocks allocated to the MS 26. The open-ended and closeended modes of allocation, discussed in the dynamic scheme, also exist. If the current assignment is not sufficient, the MS 26 can request additional resources in any of the assigned blocks in the open-mode only.

Figure 3:
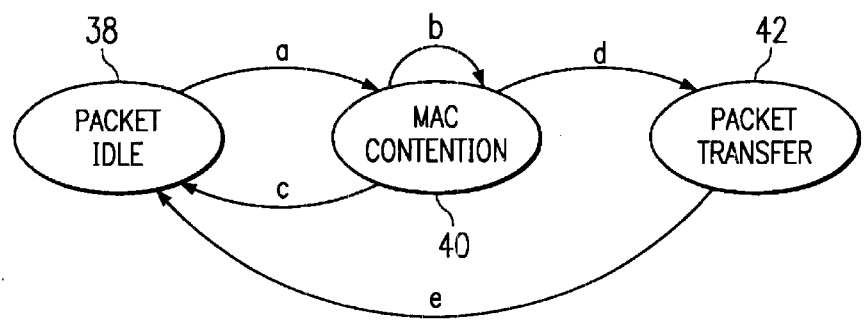
FIG. 3 is a prior art GPRS MAC state transition diagram.

FIG. 3 depicts a prior art GPRS MAC state transition diagram for the uplink data transfer scenario described in FIG. 2. The MS 26 moves (a) from a Packet Idle state 38 to a MAC Contention state 40 when it starts receiving packets from an upper layer application. In the MAC Contention state 40, the MS 26 sends (b) the Packet Channel Request message 30 to the network 10 an arbitrary number of times. If the Packet Channel Request message 30 is not processed by the network 10 within the arbitrary number of attempts, the MS 26 moves (c) back to the Packet Idle state 38. If, however, the Packet Channel Request message 30 is processed by the network 10 within the arbitrary number of attempts, the MS 26 receives the Packet Immediate Assignment message from the network 10 and moves (d) to a Packet Transfer state 42. The MS 26 may either transmit a LLC block or the Packet Resource Request message 34 to request for additional bandwidth. After the base station 12 receives a fixed number of empty packets from the MS 26, the initial and additional bandwidth (if provided) are released and the MS 26 moves (e) back to the Packet Idle state 38.

There are a number of limitations associated with this conventional process. When the fixed number of empty packets are received (i.e. the MS does not have any data to send), the entire bandwidth allocated to the MS 26 is released by the network and the network stops scheduling radio resources. If the MS 26 then has data to send, it must contend for its original and/or additional bandwidth through a common control channel. This contention phase can cause an unknown amount of time delay (potentially up to several hundred milliseconds) and Quality of Service degradation, such as speech clipping, while switching from a state of inactivity (empty packets) to a state of activity (non-empty packets). Hence, good-quality, real-time service cannot be provided because the MS must wait for the original bandwidth to be provided before sending any messages.

Figure 4:
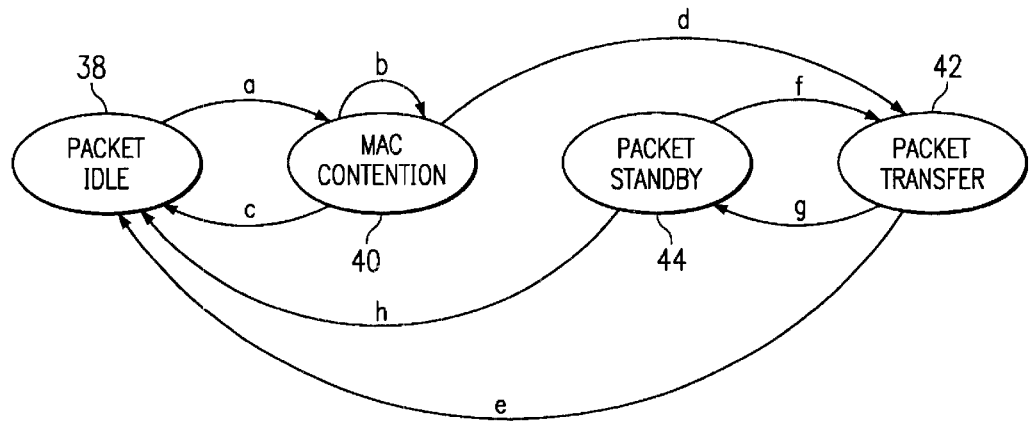
FIG. 4 is a MAC state transition diagram of the present invention.

FIG. 4 depicts a GPRS MAC state transition diagram of the present invention. Steps a-e are similar to those described in FIG. 3. In this state transition diagram, a Packet Standby state 44 is introduced. The Packet Standby state 44 permits the MS 26 to stay connected to the network 10 through a physical channel even though it may not need to send any data. This facilitates a fast switch from the inactive state to being able transmit data immediately when the MS 26 becomes "active." The MS 26 can then transmit the packets via the reduced amount of the original bandwidth when the packets again need to be transmitted. The base station receives the packets and reallocates the original bandwidth to the mobile station, when a first one of the packets (which may be a speech, video, multi-media, and/or any type of real-time service) is received by the base station or when the base station receives a control packet requesting more bandwidth. Thus, a reduced amount of the original bandwidth is assigned to the MS 26. In this manner, the MS 26 can quickly revert (f) to the Packet Transfer state 42 when required without having to go through the MAC Contention state 40 again. This saves valuable time (up to several hundred milliseconds) and permits delay-sensitive, real-time GPRS traffic (e.g. VoIP) to be provided to users of the network 10. At this point, an entity in the network 10 (for example the base station 12) will reassign the original bandwidth (i.e. the number of channels) that the MS 26 previously had. After the network 10 receives an arbitrary number of empty packets, the MS 26 enters (g) the Packet Standby state 44. The MS 26 may also enter (h) the Packet Idle state 38 if the MS disconnects the link or a release timer expires.

Referring back to FIG. 1, each entity presented may be considered a computer (which contains a computer program) that comprises a processor and memory (not shown). These computers may be the personal computer or laptop 24, the mobile station 26, the base station 12, the BTS 14, the SGSN 16, the GGSN 18, and/or any device that can send and receive GPRS information. The processor may be a central processing unit, digital signal processor, microprocessor, microcontroller, microcomputer, and/or any device that manipulates digital information based on programming instructions. The memory may be read-only memory, random access memory, flash memory and/or any device that stores digital information. The memory is coupled to the processor and stores programming instructions that, when read by the processor, cause the processor to perform certain processing operations.

Figure 5:
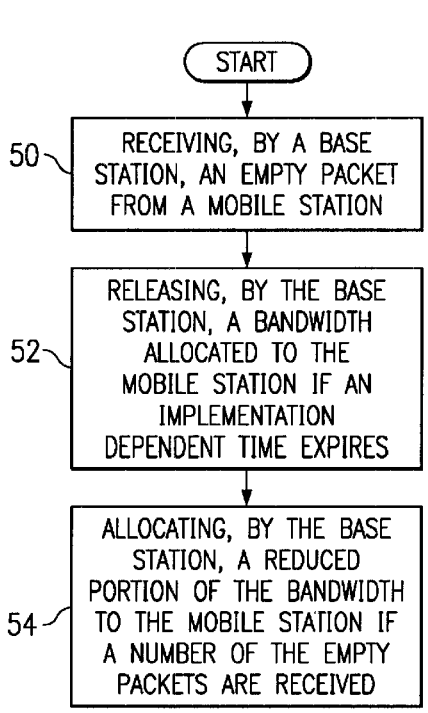
FIG. 5 is a flow chart of a method for an uplink dynamic packet transmission of the present invention.

FIG. 5 depicts a method for an uplink dynamic packet transmission that may be stored in and/or implemented by the computers described above. The method begins at step 50 where a base station (such as base station 12) receives an empty packet from a mobile station (such as MS 26). At step 52 the base station releases a bandwidth allocated to the mobile station if an implementation dependent time expires and, at step 54, allocates a reduced portion of the bandwidth to the mobile station if a number (which is implementation dependent and may be fixed) of the empty packets are received.

The mobile station can then transmit the packets via the reduced portion of the bandwidth when the packets again need to be transmitted. The base station receives the packets and re-allocates the bandwidth to the mobile station, when a first one of the packets is received by the base station or when the base station receives a control packet requesting more bandwidth. A high priority to the bandwidth allocated for conversational class packets may also be provided.

Figure 6:
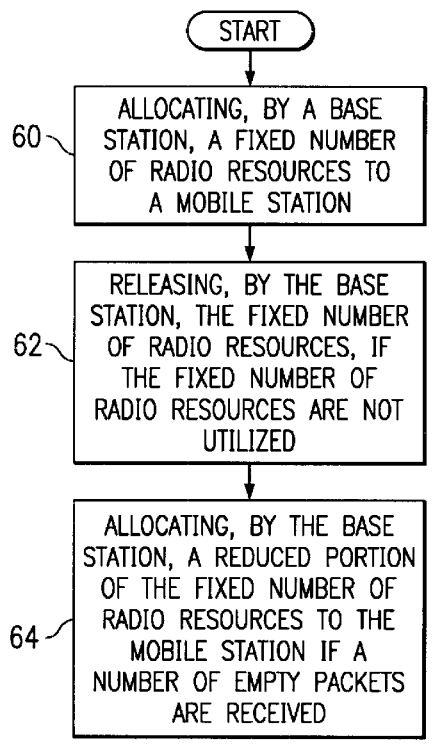
FIG. 6 is a flow chart of a method for an uplink fixed packet transmission of the present invention.

FIG. 6 is a flow chart of a method for an uplink fixed packet transmission that may be implemented by the computers described above. The method begins at step 60 where a base station (such as base station 12) allocates a fixed number of radio resources (bandwidth or channels) to a mobile station (such as MS 26). At step 62 the base station releases the fixed number of radio resources, if the fixed number of radio resources are not utilized and, at step 64, allocates a reduced portion of the fixed number of radio resources to the mobile station if a number of empty packets are received.

The mobile station can then transmit the packets via the reduced portion of the fixed number of radio resources. The base station receives the packets and reallocates the fixed number of radio resources to the mobile station when a first one of the packets is received by the base station or when the base station receives a control packet requesting more bandwidth. A high priority to the fixed number of radio resources allocated for conversational class packets may also be provided.

The present invention thus enjoys several advantages. For example, the Packet Standby state 44 is presented which permits the MS 26 to stay connected to the network 10 through a physical channel even though it may not need to send any data. This facilitates a fast switch from the inactive state to being able transmit data immediately when the MS 26 becomes "active." Thus, a reduced amount of the original bandwidth is assigned to the MS 26. In this manner, the MS 26 can quickly revert to the Packet Transfer state 42 when required without having to go through the MAC Contention state 40 again. This saves valuable time and permits delay sensitive, real-time GPRS traffic to be provided to users of the network 10.

It is understood that variations may be made in the foregoing without departing from the scope of the present invention. For example, any number and combination of entities such as base station 12, BTS 14, SGSN 16, GGSN 18, GPRS network 20, external data network 22, computer 24, GPRS-capable mobile station 26, processors, and memories may comprise or be used with the present network 10. Further, the system 10 may be connected to another wireless, wireline, data, voice, and/or multi-media system. Also, the computer program (s) that facilitate the GPRS MAC packet transmission may be fully and/or partially contained in the entities and/or computers described above. Additionally, the base station 12 may allocate a reduced portion of the bandwidth to the MS 26 if an arbitrary number of empty packets are received. This arbitrary number may be static and/or dynamic and may be set by a system administrator. Still further, the number of empty packets may be consecutively received or received in any other order. Also, the base station 12 may transmit the packets via the reduced portion of the bandwidth and may reallocate the bandwidth to the MS 26 when a plurality of packets or control packets, in any order, is received by the base station.

It is further understood that other modifications, changes and substitutions are intended in the foregoing disclosure and in some instances some features of the disclosure will be employed without corresponding use of other features. Additionally, singular discussion of items and/or computers located in the network 10 is also meant to apply to situations where items and/or computers exist. Accordingly, it is appropriate that the appended claims be construed broadly and in a manner consistent with the scope of the disclosure.

What is claimed is:

1. A system for packet transmission, wherein the system comprises:

a mobile station;

a base station, wherein the base station receives an empty packet from the mobile station, releases a bandwidth allocated to the mobile station if an implementation dependent time expires, and allocates a reduced portion of the bandwidth to the mobile station if a number of the empty packets are received; and a General Packet Radio Service (GPRS) network for coupling to the base station and to a data network.

2. The system of claim 1, wherein non-empty packets are transmitted between the mobile station and the data network.

3. A method for packet transmission in a communication network, wherein the communication network comprises a mobile station able to transmit the packets to and receive the packets from a base station, wherein the base station is coupled to a General Packet Radio Service (GPRS) network, and wherein the GPRS network is coupled to a data network, the method comprising:

receiving, by the base station, an empty packet from the mobile station;

releasing, by the base station, a bandwidth allocated to the mobile station if an implementation dependent time expires; and allocating, by the base station, a reduced portion of the bandwidth to the mobile station if a number of empty packets are received.

4. The method of claim 3 further comprising transmitting, by the mobile station, the packets via the reduced portion of the bandwidth.

5. The method of claim 4 further comprising:

receiving, by the base station, the packets; and re-allocating, by the base station, the bandwidth to the mobile station, when a first one of the packets is received by the base station.

6. The method of claim 4 further comprising:

receiving, by the base station, the packets; and re-allocating, by the base station, the bandwidth to the mobile station, when a control packet requesting additional bandwidth is received by the base station.

7. The method of claim 3 further comprising providing a high priority to the bandwidth allocated for conversational class packets.

8. The method of claim 3 wherein the packets comprise real-time voice packets.

9. The method of claim 3 wherein the packets comprise real-time data packets.

10. The method of claim 3 wherein the packets comprise real-time multimedia packets.

11. The method of claim 3 wherein the packets comprise signaling packets.

12. A method for packet transmission in a communication network, wherein the communication network comprises a mobile station able to transmit the packets to and receive the packets from a base station, wherein the base station is coupled to a General Packet Radio Service (GPRS) network, and wherein the GPRS network is coupled to a data network, the method comprising:

allocating, by the base station, a fixed number of radio resources to the mobile station;

releasing, by the base station, the fixed number of radio resources, if the fixed number of radio resources are not utilized; and allocating, by the base station, a reduced portion of the fixed number of radio resources to the mobile station if a number of empty packets are received.

13. The method of claim 12, further comprising transmitting, by the mobile station, the packets via the reduced portion of the fixed number of radio resources.

14. The method of claim 13 further comprising:

receiving, by the base station, the packets; and re-allocating, by the base station, the fixed number of radio resources to the mobile station when a first one of the packets is received by the base station.

15. The method of claim 13 further comprising:

receiving, by the base station, the packets; and re-allocating, by the base station, the fixed number of radio resources to the mobile station when a control packet requesting additional bandwidth is received by the base station.

16. The method of claim 12 further comprising providing a high priority to the fixed number of radio resources allocated for conversational class packets.

17. The method of claim 12, wherein the packets comprise real-time voice packets.

18. The method of claim 12, wherein the packets comprise real-time data packets.

19. The method of claim 12 wherein the packets comprise real-time multi-media packets.

20. The method of claim 12 wherein the packets comprise signaling packets.

21. A system for packet transmission, wherein the system comprises a mobile station able to transmit the packets to and receive the packets from a base station, wherein the base station is coupled to a General Packet Radio Service (GPRS) network, and wherein the GPRS network is coupled to a data network, the system comprises:

means for receiving, by the base station, an empty packet from the mobile station;

means for releasing, by the base station, a bandwidth allocated to the mobile station if an implementation dependent time expires; and means for allocating, by the base station, a reduced portion of the bandwidth to the mobile station if a number of the empty packets are received.

22. The system of claim 21 further comprising means for transmitting, by the mobile station, the packets via the reduced portion of the bandwidth.

23. The system of claim 22 further comprises:

means for receiving, by the base station, the packets; and means for re-allocating, by the base station, the bandwidth to the mobile station, when a first one of the packets is received by the base station.

24. The system of claim 22 further comprises:

means for receiving, by the base station, the packets; and means for re-allocating, by the base station, the bandwidth to the mobile station, when a control packet requesting additional bandwidth is received by the base station.

25. The system of claim 21 further comprises means for providing a high priority to the bandwidth allocated for conversational class packets.

26. A system for packet transmission, wherein the system comprises a mobile station able to transmit the packets to and receive the packets from a base station, wherein the base station is coupled to a General Packet Radio Service (GPRS) network, and wherein the GPRS network is coupled to a data network, the system comprises:

means for allocating, by the base station, a fixed number of radio resources to the mobile station;

means for releasing, by the base station, the fixed number of radio resources, if the fixed number of radio resources are not utilized; and means for allocating, by the base station, a reduced portion of the fixed number of radio resources to the mobile station if a number of empty packets are received.

27. The system of claim 26 further comprises means for transmitting, by the mobile station, the packets via the reduced portion of the fixed number of radio resources.

28. The system of claim 27 further comprises means for:

receiving, by the base station, the packets; and re-allocating, by the base station, the fixed number of radio resources to the mobile station when a first one of the packets is received by the base station.

29. The system of claim 27 further comprises means for:

receiving, by the base station, the packets; and re-allocating, by the base station, the fixed number of radio resources to the mobile station when a control packet requesting additional bandwidth is received by the base station.

30. The system of claim 26, further comprises means for providing a high priority to the fixed number of radio resources allocated for conversational class packets.

31. A system for packet transmission, wherein the system comprises:

a mobile station;

a base station, wherein the base station allocates a fixed number of radio resources to the mobile station, releases a fixed number of radio resources, if the fixed number of radio resources are not utilized, and allocates a reduced portion of the fixed number of radio resources to the mobile station if a number of empty packets are received; and a General Packet Radio Service (GPRS) network for coupling to the base station and to a data network.

32. The system of claim 31, wherein non-empty packets are transmitted between the mobile station and the data network.

33. A computer program comprising instructions for:

receiving, by a base station, an empty packet from a mobile station;

releasing, by the base station, a bandwidth allocated to the mobile station if an implementation dependent time expires; and allocating, by the base station, a reduced portion of the bandwidth to the mobile station if a number of the empty packets are received.

34. The computer program of claim 33 further comprising instructions for transmitting, by the mobile station, the packets via the reduced portion of the bandwidth.

35. The computer program of claim 34 further comprising instructions for:

receiving, by the base station, the packets; and re-allocating, by the base station, the bandwidth to the mobile station, when a first one of the packets is received by the base station.

36. The computer program of claim 34 further comprising instructions for:

receiving, by the base station, the packets; and re-allocating, by the base station, the bandwidth to the mobile station, when a control packet requesting additional bandwidth is received by the base station.

37. The computer program of claim 34 further comprising instructions for providing a high priority to the bandwidth allocated for conversational class packets.

38. A computer program comprising instructions for:

allocating, by a base station, a fixed number of radio resources to a mobile station;

releasing, by the base station, the fixed number of radio resources, if the fixed number of radio resources are not utilized; and allocating, by the base station, a reduced portion of the fixed number of radio resources to the mobile station if a number of empty packets are received.

39. The computer program of claim 38 further comprising instructions for transmitting, by the mobile station, the packets via the reduced portion of the fixed number of radio resources.

40. The computer program of claim 39 further comprising instructions for:

receiving, by the base station, the packets; and re-allocating, by the base station, the fixed number of radio resources to the mobile station when a first one of the packets is received by the base station.

41. The computer program of claim 39 further comprising instructions for:

receiving, by the base station, the packets; and re-allocating, by the base station, the fixed number of radio resources to the mobile station when a control packet requesting additional bandwidth is received by the base station.

42. The computer program of claim 38 further comprising instructions for:

providing a high priority to the fixed number of radio resources allocated for conversational class packets.

* * * * *